(12) United States Patent
Marshall

(10) Patent No.: US 6,851,825 B2
(45) Date of Patent: Feb. 8, 2005

(54) METHOD AND APPARATUS FOR TWO-WAY VIEWING WHILE READING

(76) Inventor: Patrick T. Marshall, 715 Columbine Ct., Tipp City, OH (US) 45371

( * ) Notice: Subject to any disclaimer, the term of this patent is extended or adjusted under 35 U.S.C. 154(b) by 0 days.

(21) Appl. No.: 10/357,109

(22) Filed: Feb. 3, 2003

(65) Prior Publication Data

US 2003/0184996 A1 Oct. 2, 2003

Related U.S. Application Data

(60) Provisional application No. 60/369,132, filed on Apr. 1, 2002.

(51) Int. Cl.⁷ .............................................. F21V 33/00
(52) U.S. Cl. .......................... 362/142; 362/98; 362/396
(58) Field of Search ................................ 362/396, 135, 362/136, 137, 138, 139, 142, 143, 144, 98, 99; 359/872, 838; 248/126, 231.81, 474, 476, 479, 486, 487

(56) References Cited

U.S. PATENT DOCUMENTS

| | | |
|---|---|---|
| 170,042 A | 11/1875 | Anthony |
| 2,473,938 A | 6/1949 | Cannizzaro et al. |
| 2,524,461 A * | 10/1950 | McDowell .................. 362/98 |
| 3,408,033 A * | 10/1968 | Kochevar et al. .......... 248/474 |
| 4,598,340 A | 7/1986 | Dwosh et al. |
| 4,637,631 A | 1/1987 | Baer |
| 4,869,529 A | 9/1989 | Hoffman, Jr. |
| 5,386,322 A * | 1/1995 | Parsons ..................... 362/135 |
| 5,453,915 A * | 9/1995 | Bradley, III ................ 362/144 |
| 5,688,037 A * | 11/1997 | Chen .......................... 362/98 |
| 5,695,271 A | 12/1997 | Zeller |

* cited by examiner

*Primary Examiner*—Y. My Quach-Lee
(74) *Attorney, Agent, or Firm*—Martin & Associates, L.L.C.; Derek P. Martin

(57) ABSTRACT

An attachable book mirror device enables the reader of a textual document to view the facial expressions of the young adult, child, toddler, or baby who is listening in close proximity to the reader. The listener can also view the mechanical lip movements of the reader to thereby shorten process of learning to read. The attachable book mirror includes a shell for housing the optically human visual spectrum reflective material that is pivotally connected to a base used to attach to the covers of books or any other suitable document. The reflective material can be adjusted in any allowable position, holding its last position due to certain equal but opposite forces that are generated by certain internal components such as a spring contained within the base that helps create a lasting static contact frictional force. An adjustable light may be pivotally attached to the book mirror.

27 Claims, 17 Drawing Sheets

METHOD AND APPARATUS FOR TWO-WAY VIEWING WHILE READING

REFERENCE TO RELATED APPLICATIONS

The present application hereby claims the benefit of the provisional patent application of the same title to Pat Marshall, Ser. No. 60/369,132, filed on Apr. 1, 2002.

FIELD OF THE INVENTION

The present invention relates to a reflective viewing device for two individuals to view each others faces while reading a book, and in particular, to a book light incorporating a mirror.

BACKGROUND OF THE INVENTION

Many parents read bedtime stories to their children and don't realize all of the wonderful and amazing facial expressions that their children are creating while being read to. This problem is solved when a child is sitting on a parent's lap and the book mirror invention is attached to the book's cover. Then the parent or child can adjust the invention's position and the book's position until they both locate each other's reflections while using the mirror. The reader is now ready to read the pages of the book while glancing periodically at the listener. Likewise, while the reader is articulating words from the pages of the book or magazine, the listener can use the mirror to correlate lip movements of the reader with the audio words currently being spoken.

U.S. Pat. No. 4,637,631 discloses a combined book and mirror. However, this device is only good for one book and the mirror has to be manufactured into alternating pages of the book. Obviously, this wastes an entire page, or a part of a page, that would normally have been used by the adult to read to the child. Another disadvantage is that this device is inherently thicker and heavier than a book with a similar quantity of pages but without any mirrors. And, the device is inherently rigid and does not allow for adjustments of the mirror only without moving the book's position. This limits the reader and listener to clearly see each other's face while being comfortably situated in any position.

Likewise, there are now children's books on the market that have a mirror incorporated into the back cover of the book. It is believed that the orientation of such a mirror is suitable for the viewer to see his own face rather than to have a reader and listener see each other's faces. These books also suffer from some of the same, previously disclosed, disadvantages of U.S. Pat. No. 4,637,631. For example, every page of the book now has to have a large enough hole so each person can see each other's reflection in the mirror. This, again, wastes space that should normally be dedicated to words and/or pictures for the reader and listener. Moreover, the entire book has to be held in an orientation that allows the reader and listener to see each other in the mirror.

Other art, such as U.S. Pat. No. 2,473,938, discloses a combined photograph album and music box. Also, U.S. Pat. No. 170,042 discloses a photograph album which has been modified such that articles may be inserted into the book.

Book-lights of various types are, of course, well known in the prior art. Most all of these lights are of standard size and are adapted to be clamped or attached to the back cover of a book. For example, U.S. Pat. No. 5,695,271, U.S. Pat. No. 4,598,340, and U.S. Pat. No. 4,869,529 all disclose book light devices that attach to the cover for the purpose of illuminating pages of a book. However, none of these discloses a mirror that is designed and manufactured as an integral part of the whole product.

Consequently, a significant need exists for mirror that may be easily attached to a book.

BRIEF SUMMARY OF THE INVENTION

The present invention addresses these and other problems in the prior art by providing a mirror device that attaches to readable documents that allows a reader and a listener to view both the reading material and see each others face at the same time. Thereby, the enjoyment and learning potential of reading is enhanced by providing a flexible means for conveying nonverbal communication within a verbal communication media. Being attachable and portable, such a mirror device may enhance reading of a wide variety of books and similar documents.

In one aspect of the invention, a device enhances reading a book to another individual by having a gripping member that attaches to the book and having a reflective member at a preselected orientation that reflect the face of one of the individuals to the other. For example, the preselected orientation may be permanently set at an angle typically convenient for seeing each other. Moreover, the reflective member may have a degree of curve to it (i.e., convex) allowing for each party to be in a range of respective orientations while still being visible to the other.

Another object of the present invention is to create a more enjoyable environment for persons reading books orally to other individuals being their subjects. The present invention accomplishes this by providing an apparatus and means for the reader of the book to clearly view the facial expressions and reactions of the person being read to. This invention allows the person reading any book to visually enjoy the many wonderful and inquisitive facial expressions emanating from their subject.

In addition, the person reading the book will now be allowed to see if the young adult, child, toddler, or baby is understanding what they are currently listening to. For instance, a parent may ask a questions regarding the material contained within the book, and watches as the child searches for or deduces the answer (e.g., "How many yellow birds are there?", "Can you find the umbrella?"). If not, the person reading the book, or and other suitable text document, can respond to the feedback, such as by then pausing and rearticulating the previously spoken audio words in the hopes of helping the subject. Thereby, a parent may diagnose why a child is having difficulty, such as a short attention span, and adjust the reading based on visual confirmation that the child is listening.

Another object the invention is to decrease the learning curve for young readers and handicapped readers by allowing them to visually see their teacher's mouth who is articulating words from the pages of any document in any language around the world. Therefore it is yet another object of this invention to provide a means for the person being read to view the mechanical lip motions of the reader of the document in the hopes of correlating the visual and audio information together to words that are currently being orally articulated from pages of any book.

It is therefore an objective of this invention to provide an apparatus comprising a base, a top shell hingedly attached to the base, and a first reflective surface secured to the top shell. The base is arranged to be releasable attachable to an information carrier such as a book, magazine or other printed media, picture, illustration, graphic or artistic work, or other recorded information.

It is also another object of this invention to allow the person being read to be comfortably positioned on the lap of, or in close proximity to, the reader of the pages of the book.

It is yet another object of this invention to allow the attachable reflective surface device to be adjusted for any angle for the purpose of viewing facial expressions of both the reader and the person being read to.

It is another object of this invention to provide a portable book light and mirror combination for the purpose of illuminating reading material in dimly lit areas.

Lastly, there are several versions of the previously discussed circuits and mechanical parts and configurations that were not disclosed. However, it shall be assumed that all other versions become obvious to anyone skilled in the art and who understands the embodiments of this document.

These and other objects and advantages of the present invention shall be made apparent from the accompanying drawings and the description thereof.

BRIEF DESCRIPTION OF THE FIGURES

The accompanying drawings, which are incorporated in and constitute a part of this specification, illustrate embodiments of the invention, and, together with the general description of the invention given above, and the detailed description of the embodiments given below, serve to explain the principles of the present invention.

DETAILED DESCRIPTION OF THE INVENTION

Figure 1:
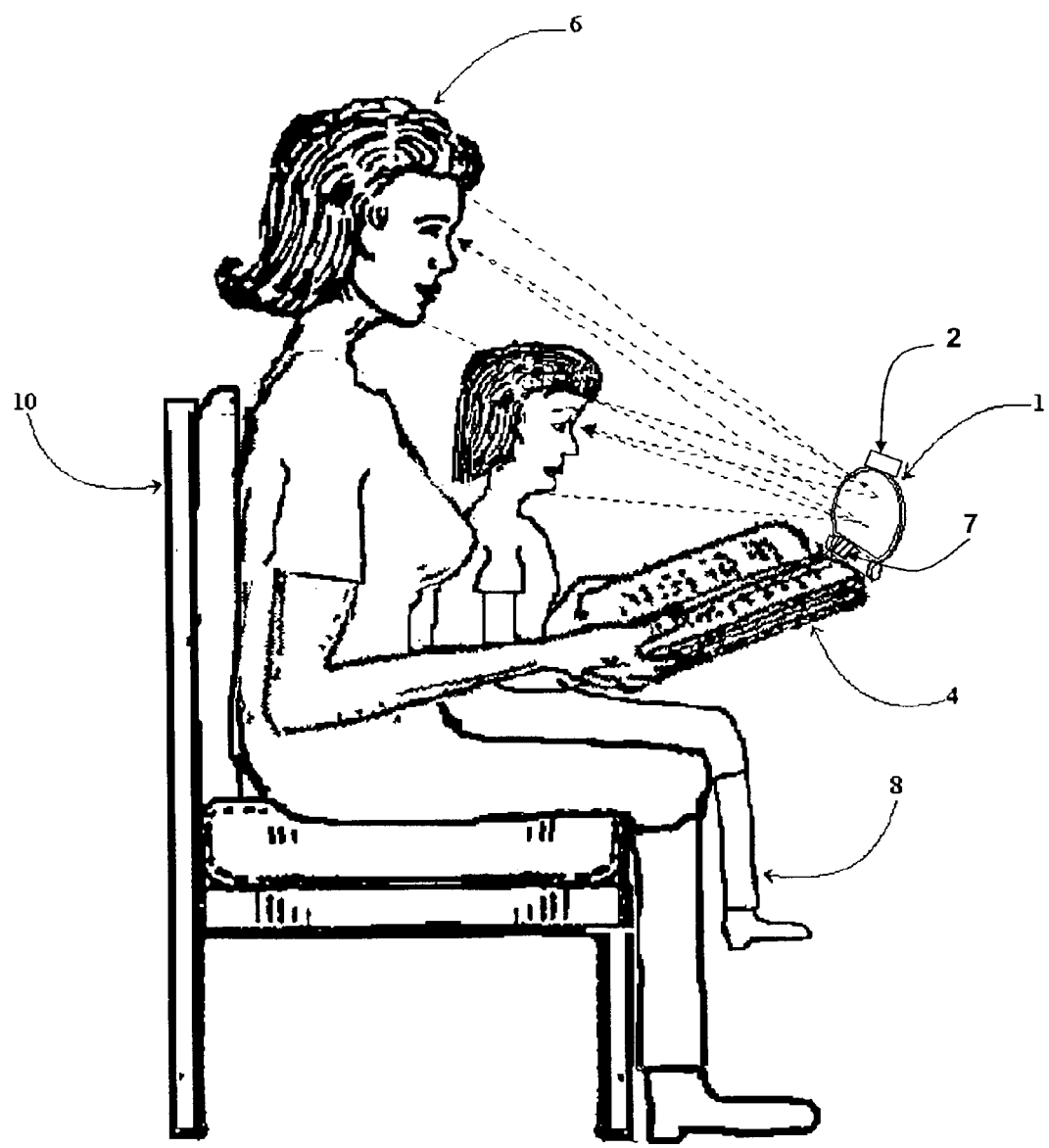
FIG. 1 is an illustration of the adjustable book mirror when in use according to one embodiment of the present invention.

Refer to FIG. 1 where an in-use-illustration is presented according to an embodiment of the invention. As can be seen, an adjustable book mirror 1 is shown attached to a front or back cover of a book 4. Also shown in this figure is an adult 6 reading to a child 8 with the adjustable book mirror 1 attached to the book 4 all while seated on a chair 10. This methodology allows the adult 6 to see the child's facial expressions clearly while reading a story. As a result, the adult 6 can finally see facial expressions that were never before possible while reading a book to the child 8. In addition, this also allows the child 8 to watch the mechanical motion of her adult's 6 lips.

It is well know in the art that lip reading is possible and that all people, whether handicapped or not, benefit from watching the mechanical motions of the human mouth while speaking. Furthermore, the adjustable book mirror 1 will help the child 8 associate the mechanical motions of her adult's 6 lips with the words that she is currently vocalizing. Consequently, this adjustable book mirror 1 invention will also help the child 8 learn to read and speak the language of the adult 6.

It should be appreciated that the adjustable book mirror 1 may advantageously be used by a single individual, whereupon the facial expressions of the reader are reflected back to the reader. The visual feedback to the reader enhances rehearsing speeches and performances. For the hearing impaired, the visual feedback would be useful in verifying proper pronunciation of the words.

The adjustable book mirror 1 advantageously incorporates a light 2, which may project light onto the book to aid in reduced lighting situations and/or onto the faces of the adult 6 and child 8. To further enhance the reading experience, the adjustable book mirror 1 may further incorporate an audio player 7, such as a radio, digitally recorded audio device, etc. to provide a soothing melody.

It will be appreciated by those of skill in the art having the benefit of the present invention that the book mirror 1 may incorporate a reflective surface having many characteristics, some of which are described in greater detail below. For example, a reflective surface may have a preset orientation with respect to a gripping member that attaches to the book, with the orientation selected as typically convenient for each individual to see the other. This simplified connection between the gripping member and reflective member provides economical advantages. In addition, a convex reflective surface may be particularly appropriate with such a fixed orientation so that each individual may be at a range of positions relative to each other and the book, yet be in view of the other.

Figure 2:
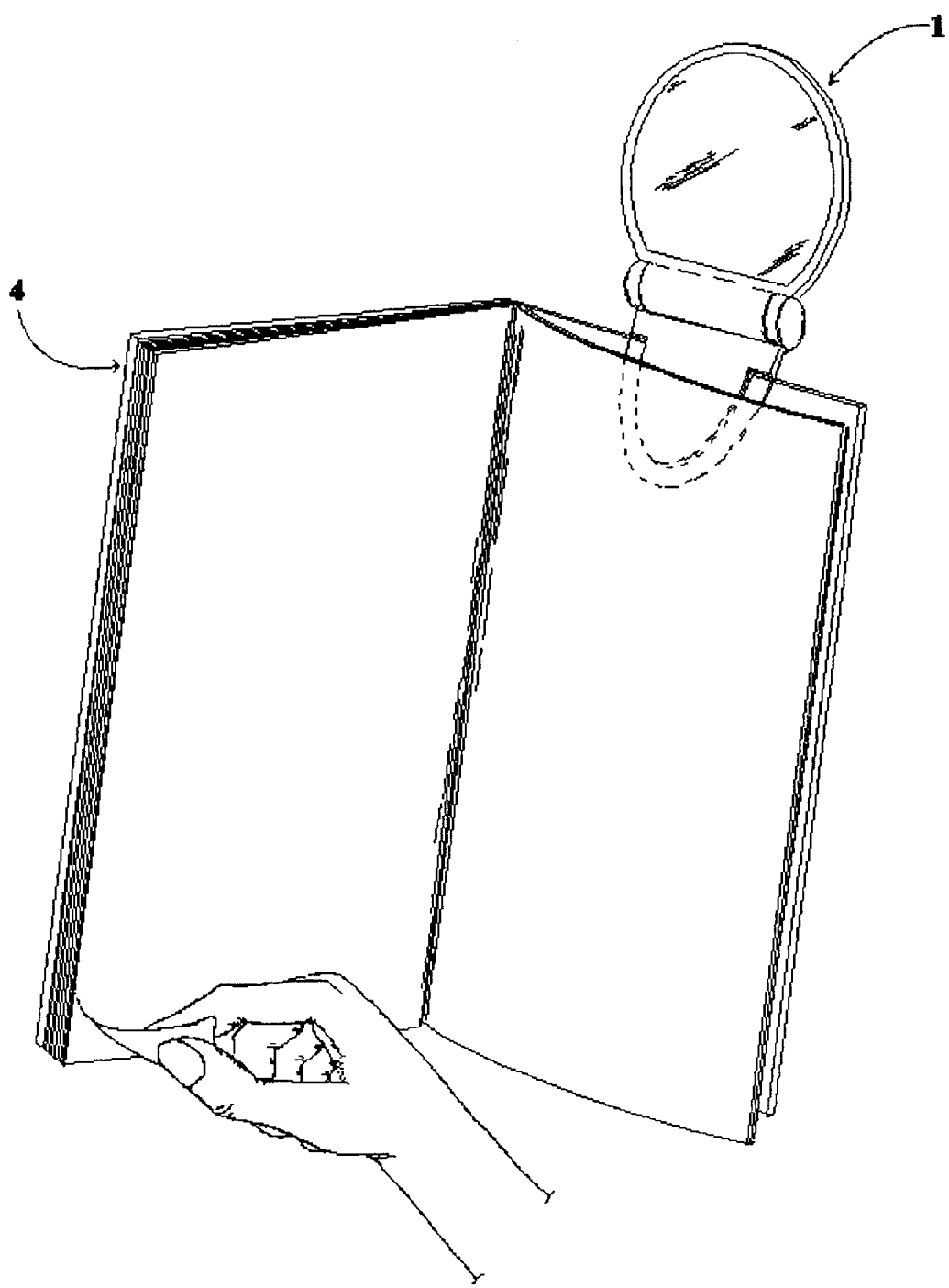
FIG. 2 is a close-up illustration of the adjustable book mirror invention clamped to a book.
Figure 6:
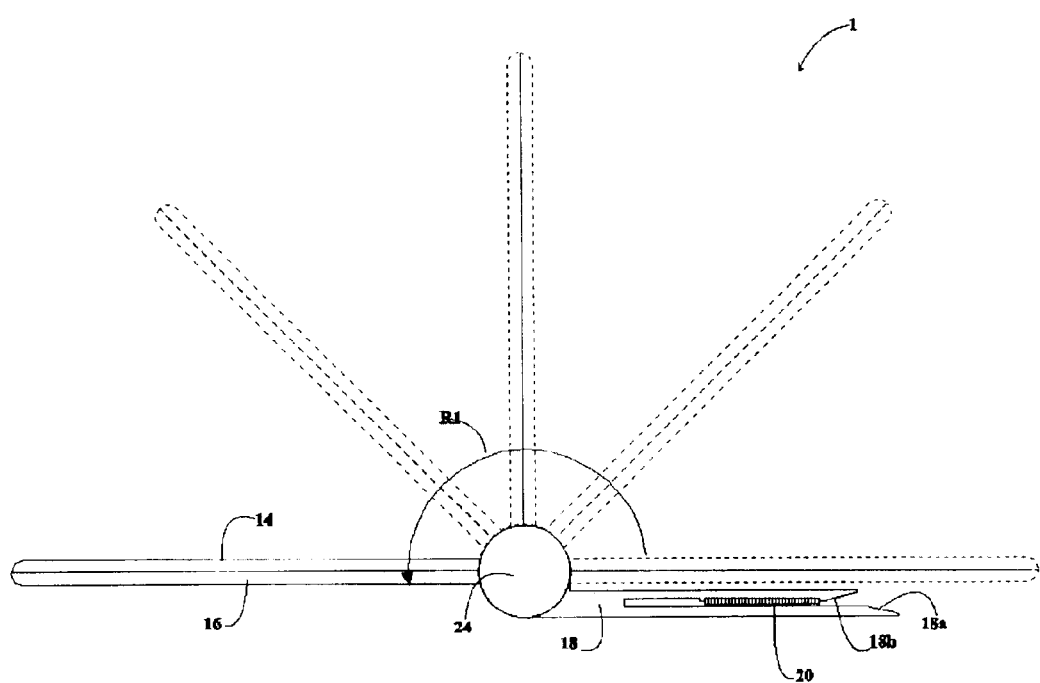
FIG. 6 is a side-view of the adjustable book mirror invention highlighting its many possible positions.

Refer now to FIG. 2 where a close-up illustration of the present invention is shown clamped to the book 4 according to the embodiments of the invention. This illustration shows how the adjustable book mirror 1 is attached to the book's 4 back cover. The adjustable book mirror 1 is clamped to the book 4 simply by sliding it over the cover. It can then be adjusted in the horizontal position along the length of the back book 4 cover. Then, the mirror itself can be adjusted in a circular rotation about the mirror's vertical axis, as shown in FIG. 6. All of these adjustments will allow the person reading the book to clearly see the child and vise-versa.

Figure 3:
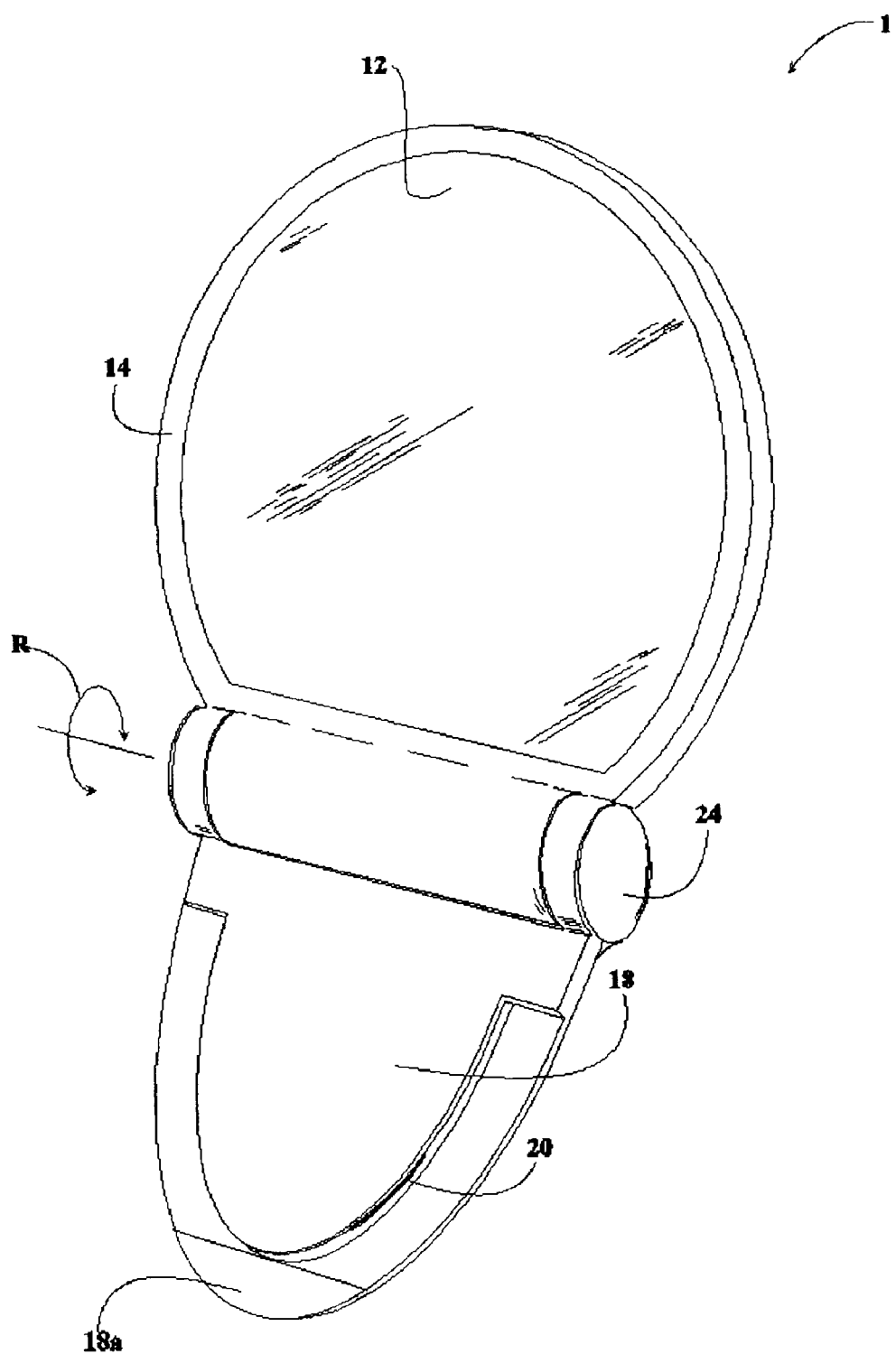
FIG. 3 a perspective view of the adjustable book mirror invention.
Figure 4:
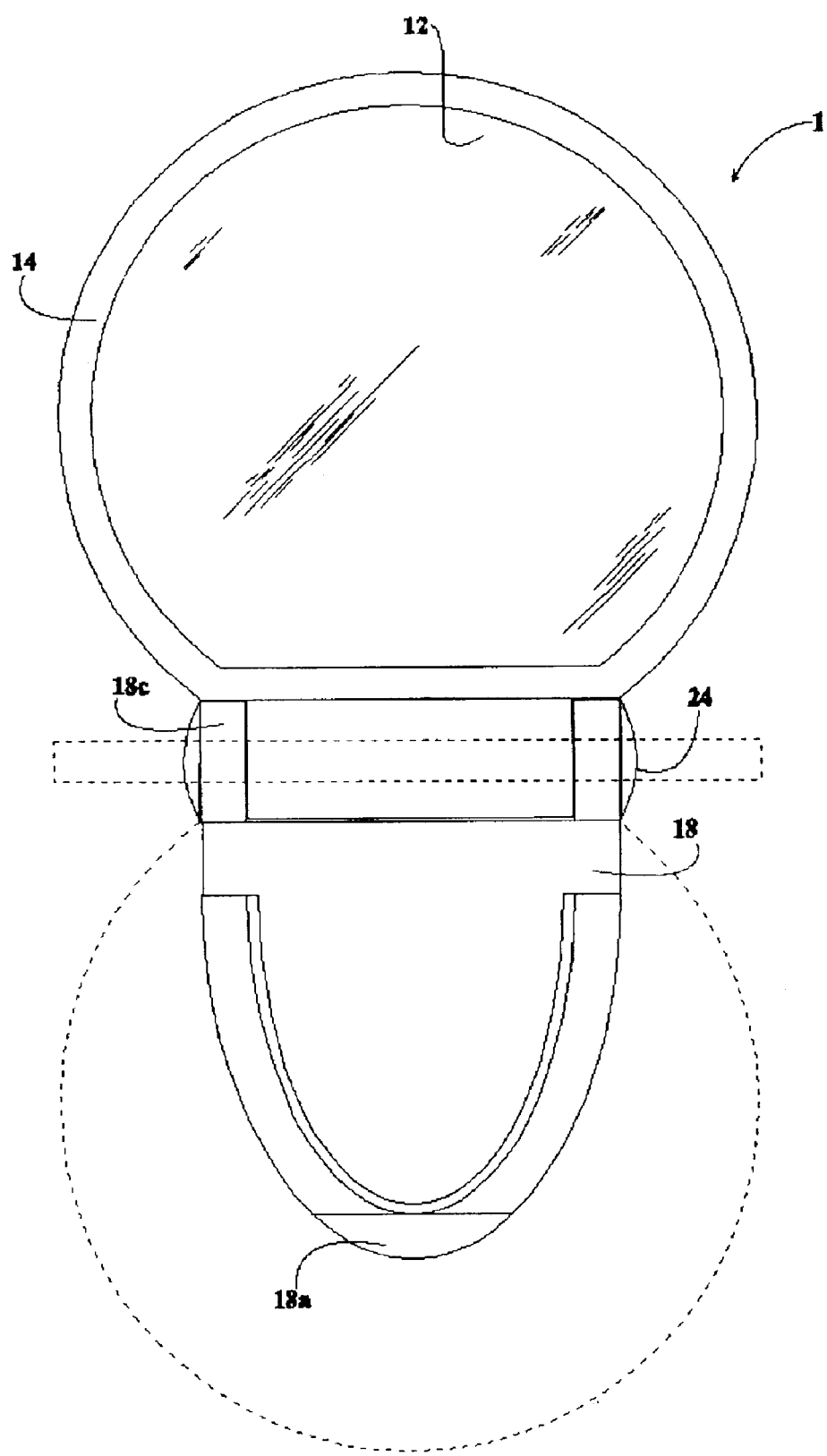
FIG. 4 is a front-view of the adjustable book mirror invention.

Refer to FIGS. 3 and 4 where perspective and front views of the present invention are shown according to the embodiments of the invention. A somewhat circular mirror 12 is shown mounted into a top shell 14 and a matching bottom shell (not shown). The top shell 14 and bottom shell can be both manufactured using normal plastic injection molding processes. The mirror 12 can be made of normal mirror materials such a glass with an opaque backing. Likewise, the mirror can be composed of any suitable material that has a reflective surface. However, for safety reasons, it is preferable to have the mirror 12 made of harmless shiny-aluminum material or a shatter-resistant plastic (e.g., polycarbonate, acrlic, mylar, etc.). This mirror material is used extensively in many common plastic toys. However, the optical quality must be either equal or greater as compared to normal household-type glass mirrors.

The mounted mirror 12 and top shell 14 and bottom shell form a male hinge section which is inserted into a female hinge section 18c of a base 18 to form a pivoting mechanism, or by any other hinged devices, not limited by this invention. A pair of end caps 24 may be disposed on two opposite end portions of the base 18. Likewise, these end caps 24 can be manufactured using standard plastic injection molding techniques. However, these end caps 24 may also be eliminated by designing and manufacturing the base 18 with attached end caps 24 or with no end caps at all. Alternatively, the end caps may include male threads received by female threads on a nonadjacent portion of the pivoting mechansim. Thus, a variable amount of friction may be presented between the end caps and an adjacent portion of the pivoting mechanism that moves relative to the end cap. Thus, tightening the attachment aids in maintaining the orientation with a variable amount of resistance. In addition, disassembly of the end caps by a child is thwarted, especially when a tool attachment structure (e.g., hex head aperture) is included for tightening the end caps, or other locking mechanism.

Next, the user attaches the adjustable book mirror 1 to the book by sliding the base over the book's back cover. The user accomplishes this by inserting the tip of the base 18, which has a chamfer edge 18a, over the back of the book cover. Another chamfered edge (not shown) then is slid over the top of the book cover. The book mirror 1 is inserted until the book cover's top edge rests against the base 18. A rubber pad 20 is then used to help hold the whole adjustable book mirror 1 firmly in place. When the adjustable book mirror 1 is properly inserted the mirror 12 may be rotated by a circular R fashion. This allows the mirror 12 to be adjusted to any position in the R axis that is agreeable to its user.

Figure 5:
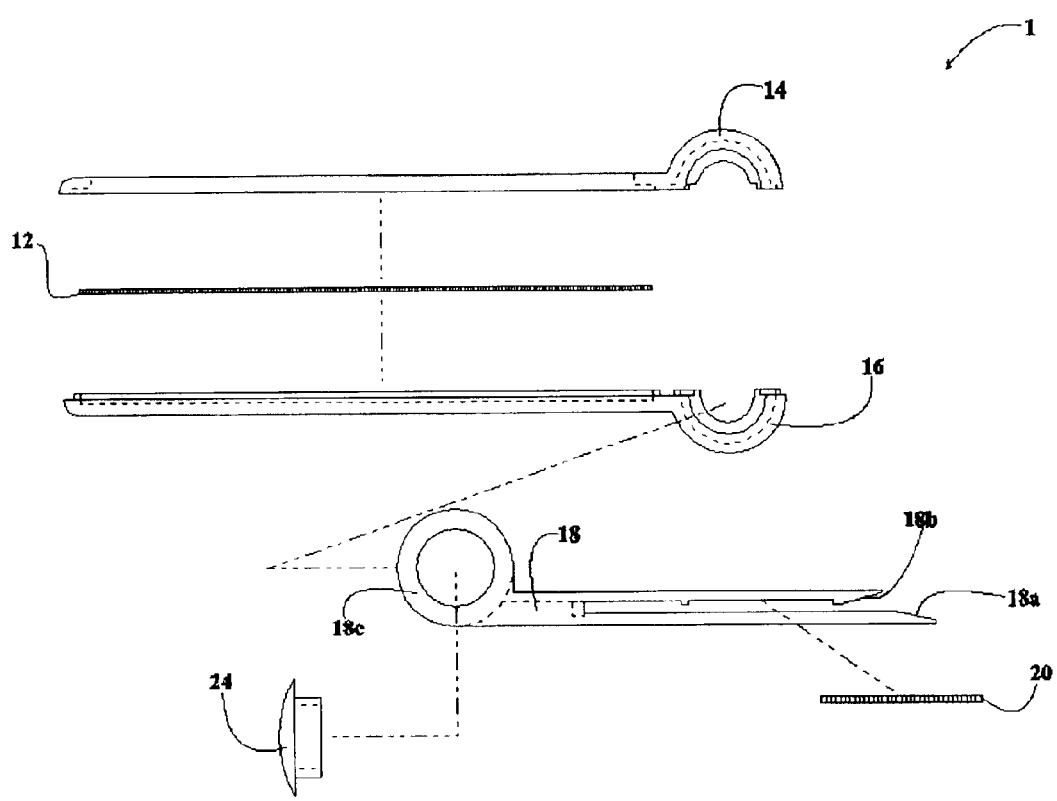
FIG. 5 is an assembly-side-view of the adjustable book mirror invention.

Refer to FIG. 5 where an assembly side-view of the adjustable book mirror is shown according to the embodiments of the invention. A non-toxic glue is first applied along the edges of the top shell 14 and a bottom shell 16. The mirror 12 is then inserted between the top shell 14 and bottom shell 16. The three pieces are subsequently pressed together and held firmly in place until the glue dries.

Next the rubber pad 20 must now be glued to the base 18 and allowed to sufficiently dry. Then the assembled mirror 12 and top shell 14, and bottom shell 16 can now be inserted into the two female hinge sections 18c which are part of the base 18. The two female hinge sections 18c must be bent slightly outward to allow the preassembled mirror 12, top shell 14, and bottom shell 16 to be inserted in place. Once completed the two female hinge sections will go back to their original shape thus holding the whole assembly firmly in place. The pair of end caps 24 are then inserted into the two female hinge sections 18c. If designed and manufactured properly the pair of end caps 24 may be press-fitted into place and may not require any glue to be held firmly in place. However for safety reasons, a non-toxic glue may be used just to make sure that they cannot be pulled back out. Also the two end caps' 24 diameters should be designed large enough to not allow a child to choke on them if they are successful in pulling them back out.

When all adhesives have thoroughly dried, the user may now attach the adjustable book mirror 1 to the book by sliding the base over the book's back cover. The user does this by inserting the chamfer edge 18a over the back of the book cover. Another chamfered edge 18b is then slid over the top of the book cover.

Refer to FIG. 6 where a side-view of the present invention according to the embodiments of the invention is shown. As can be seen the book mirror 1 can be opened and adjusted to any position R1.

Figure 7:
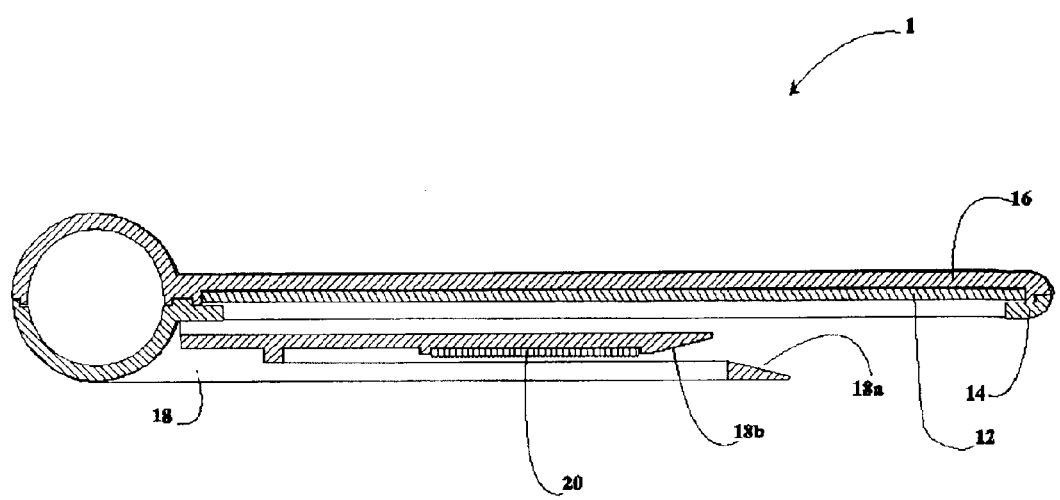
FIG. 7 is a cross-sectional side view of the adjustable book mirror invention.

Refer now to FIG. 7 where a cross-sectional-side-view of the present invention according to the embodiments of the invention is shown. As can also be seen the book mirror 1 is designed to be assembled with snap-together pieces. However to maximize strength, most of the larger parts, such as the top shell 14 and bottom shell 16, should be glued together with a non-toxic adhesive.

Figure 8:
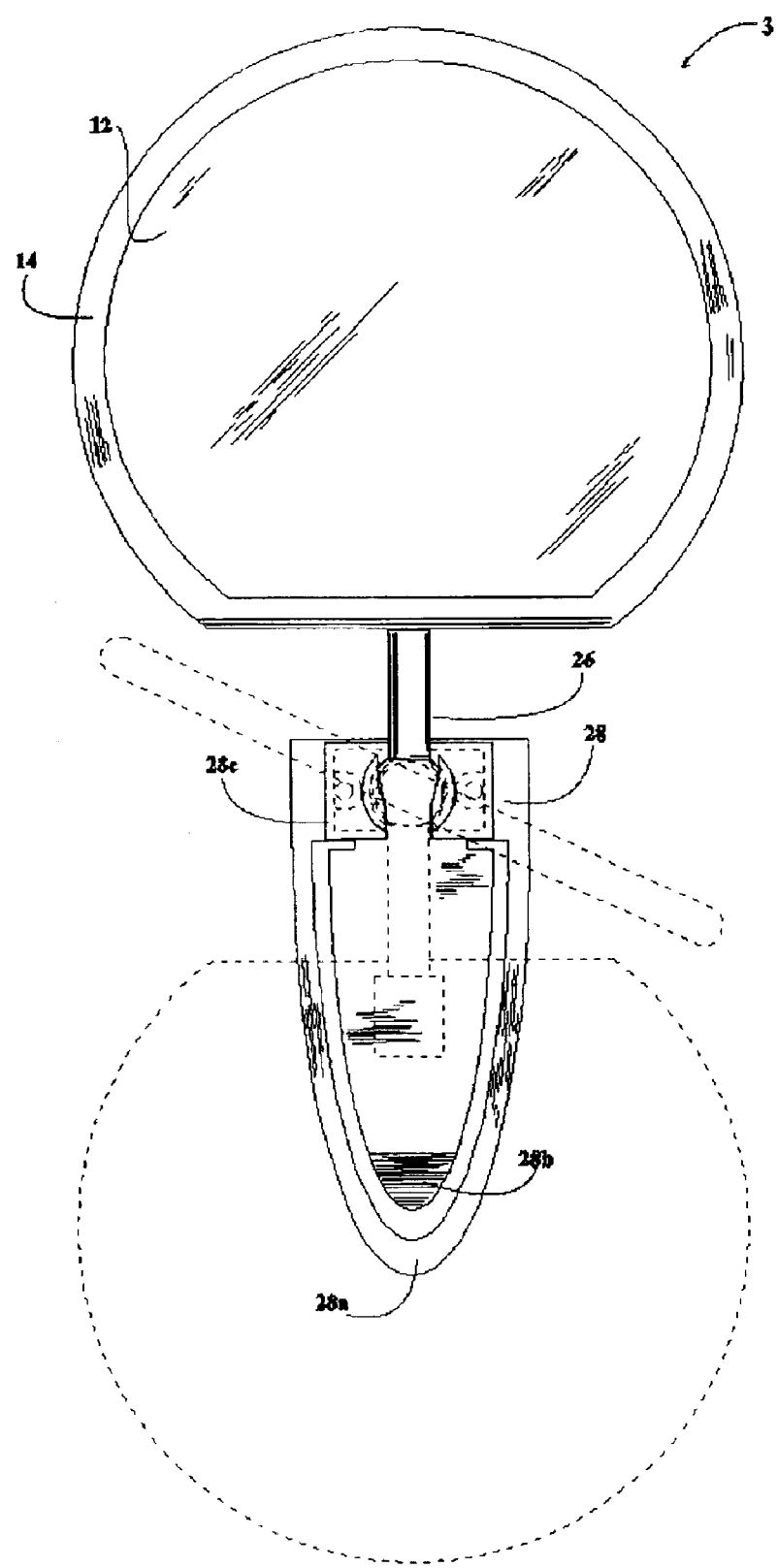
FIG. 8 is a front-view of a different design for a pivoting book mirror invention according to another embodiment of the invention.

Now refer now to FIG. 8 where a front-view of a new pivoting book mirror 3 according to another embodiment of the invention is shown. As can be seen the main difference between this version of the invention and the previous one is that the pivoting book mirror 3 can now be adjusted in more than one dimension. This will allow the user to adjust the mirror 12 without the need to slide the whole device along the back of the book's cover in the horizontal direction with respect to the axis of the book's cover. To allow this multi-directional alignment of the mirror 12, the essential elements of the pivoting book mirror 3 comprise a pivoting base anchor 28 consisting of a capsule 28c from which projects upwardly, a tubular arm 26 for supporting the preassembled top shell 14, bottom shell (not shown), and mirror 12. The tubular arm 26 is threaded on its flat end and is attached simply by screwing it into a matching female receptacle that is manufactured into to the back of the bottom shell. Once assembled the tubular arm 26 will be allowed to pivot and/or rotated in just about any direction in a three-dimensional coordinate space. All of this is designed, manufactured, and assembled in a manner to be described hereinafter, and means for attaching capsule 28c which is bearing top shell 14, mirror 12, and bottom shell to a book, magazine or the like comprising a clamp formed of a upper two-armed member consisting of a rigid base section 28a and a movable base section 28b. The rigid base section 28a and the movable base section 28b are all rigidly attached, preferably as an integral piece with the capsule 28c, to the pivoting base anchor 28. More specifically, the pivoting base anchor 28 has arms integrally attached at one end to capsule 28c and preferably, but not necessarily, connected as one piece. All of these members (i.e., rigid base section 28a, movable base section 28b, and capsule 28c) can form a rigid construction which may be molded as one piece of appropriate plastic to form the entire pivoting base anchor 28.

Figure 9:
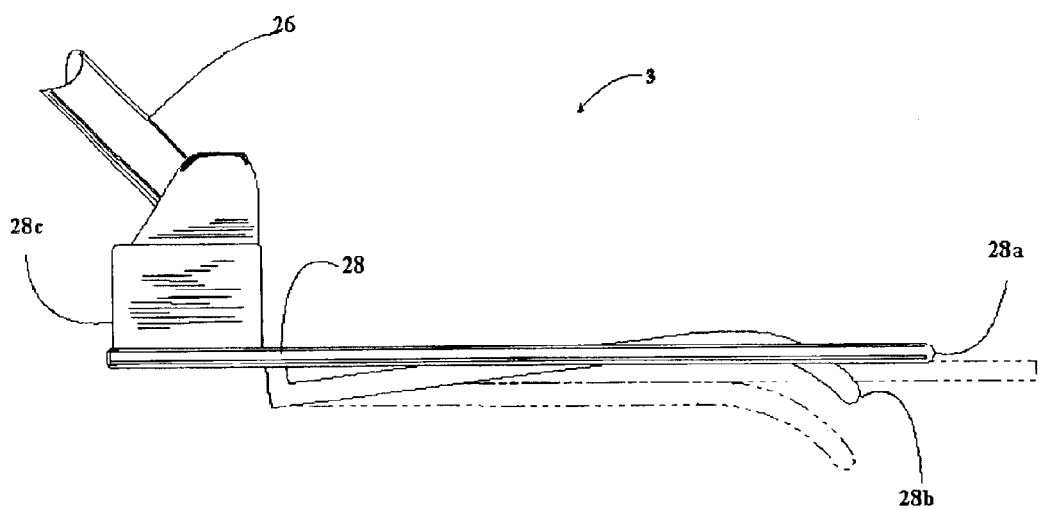
FIG. 9 is a side-view of the pivoting book mirror and light invention.

Refer to FIG. 9 where it is shows a side-view of the pivoting book mirror 3 according to the embodiments of the invention. In this figure, only a partial view of the tubular arm 26 is shown. As can be seen, tubular arm 26 is attached as a movable and adjustable piece to the inside walls of the capsule 28c. Other mechanisms inside the capsule are then used to hold the tubular arm semi-rigidly in place. As can also be seen, the movable base section 28b is formed in a somewhat tongue-shaped fashion fitting, preferably as one integral piece, within member 28a. Also note that the movable base section 28b has a raised bow section which in its normal position, may extend slightly above member 28a. The dimensions of members 28a and 28b as such that they provide a sufficient gripping surface to clamp between them a number of pages to the cover of a book or other document so that the pivoting book mirror 3, in essence, becomes self-supporting to allow the tubular arm 26 to be safely adjusted in any direction.

Figure 10:
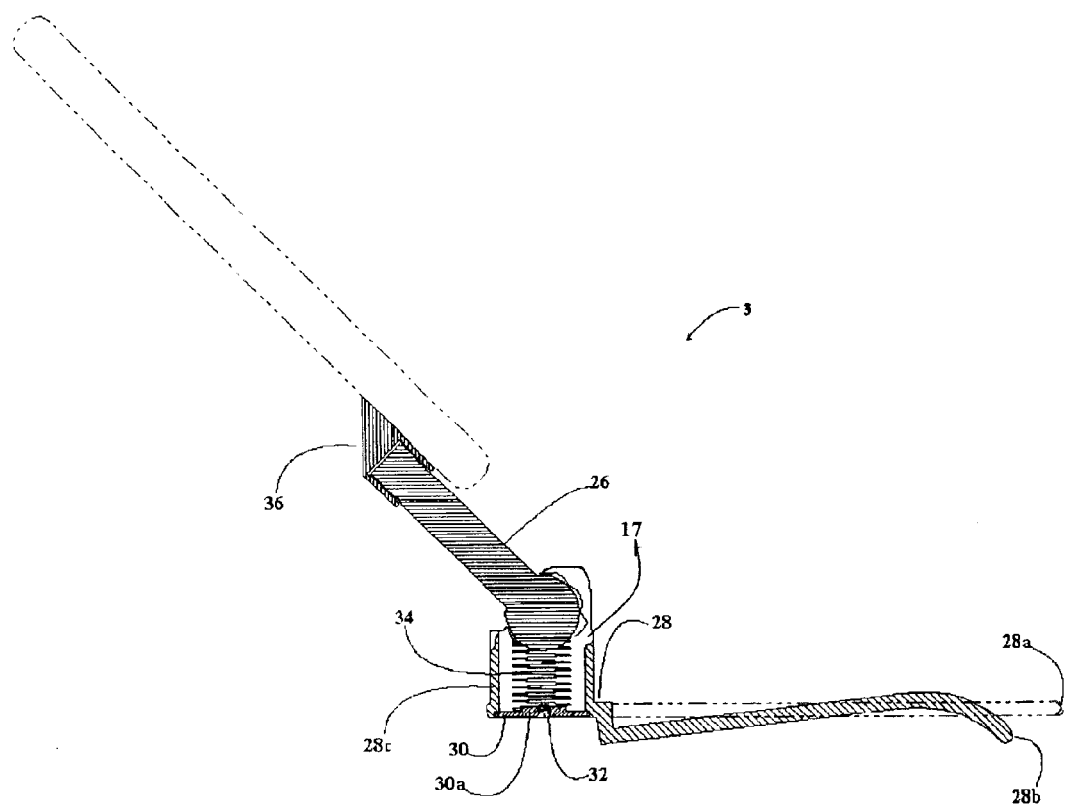
FIG. 10 is a cross-sectional side view of the pivoting book mirror and light invention.

Refer now to FIG. 10 where a cross-sectional side view of the pivoting book mirror 3 is shown according to the embodiments of the invention. In this figure it can be clearly seen how a matching female receptacle 36 is manufactured as part of the back of the mirror containing shell which makes up a mirror assembly 17. However this receptacle 36, can be, as previously mentioned, be made as one rigid piece as part of the bottom shell or it can also be manufactured as a separate piece that is later attached to the bottom shell by any suitable means such as self-tapping screws and strong adhesives. Once attached, the tubular arm 26 can then be attached to the mirror assembly simply by screwing it into the matching female receptacle 36. However, before this can be accomplished, the tubular arm 26 must first be inserted up through a large opening in the bottom of capsule 28c and then through a smaller opening in the top of capsule 28c, both of which are manufactured as part of the pivoting base anchor 28. The smaller opening in the top of capsule 28c will prevent the tubular arm 26 from being pulled out the top of the capsule 28c. However, the smaller opening in capsule 28c is manufactured large enough to allow the tubular arm 26 to be pivoted or rotated in just about any direction in a three-dimensional coordinate system.

A suitable metal or plastic spring 34 is then inserted up into the inside of the capsule 28c through the opening in the bottom of the pivoting base anchor 28 until it is fully seated up against the rounded bottom end of the tubular arm 26. The spring 34 must be designed to hold the mirror assembly firmly in place after final assembly is accomplished. However, the spring's 26 constant coefficient must also allow free movement of the mirror assembly with very little force from its user.

To close the opening and hold the spring 34 and tubular arm 26 firmly in place, a cover 30 is then next inserted up into the opening in the bottom of capsule 28c. A short alignment peg 30a that is molded into the topside of cover 30 is then used to align the spring 34 with the whole assembly. This round peg 30a is designed and manufactured to be slightly smaller than the inside diameter of the spring 34. A screw 32, or a plurality of screws 32, is then used to secure the cover 30 to the pivoting base anchor 28. Once assembled, the tubular arm 26 will be allowed to pivot and/or rotated in just about any direction in a three-dimensional range.

As can be seen, the spring 34 is compressed to apply a static force on the tubular arm 26 after final adjustment of the mirror assembly 17 by the user. The spring 34 is used to apply pressure to the round bottom of the tubular arm 26 which is prevented from going any further by the top inside of the capsule 28c. This is designed to help hold the mirror assembly 17 and the attached tubular arm 26 both firmly in place once adjustment is completed. However, the tension in the spring cannot be made too high to make the adjustment too rigid for the user to comfortably adjust the tubular arm 26 and attached mirror assembly 17. Likewise, the tension in the spring 34, after final assembly, cannot be made too low as to not hold the load of both the pivoting arm 26, and all other attached pieces, firmly in place once the user completes adjustment of the mirror assembly 17. As a result, selection of a spring 34, if purchased as an off-the-shelf item, is very important for the correct operation of the pivoting book mirror 3 invention.

All previously mentioned plastic parts, such as the female receptacle 36, the tubular arm 26, the cover 30, and the pivoting base anchor 28 can all be made from standard plastic-injection molding processes. The spring 34, if made of metal, can be manufactured using normal spring manufacturing machines. Likewise, the metal screws 32 can all be manufactured from any standard screw-molding machines.

Figure 11:
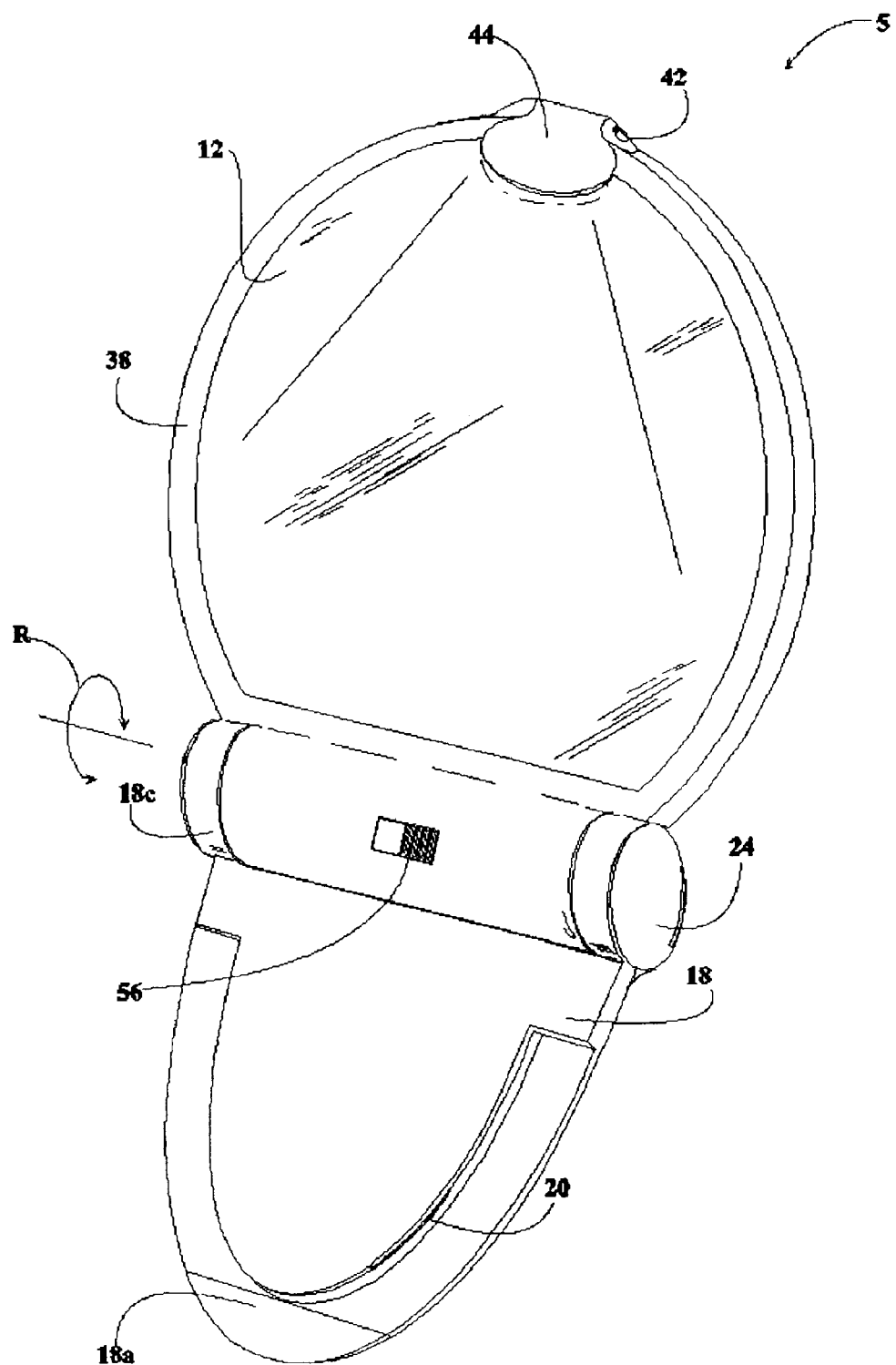
FIG. 11 is a perspective view of another variation of the adjustable book mirror invention shown now with an adjustable lighting apparatus attachment which is in accordance with another embodiment of the invention.
Figure 12:
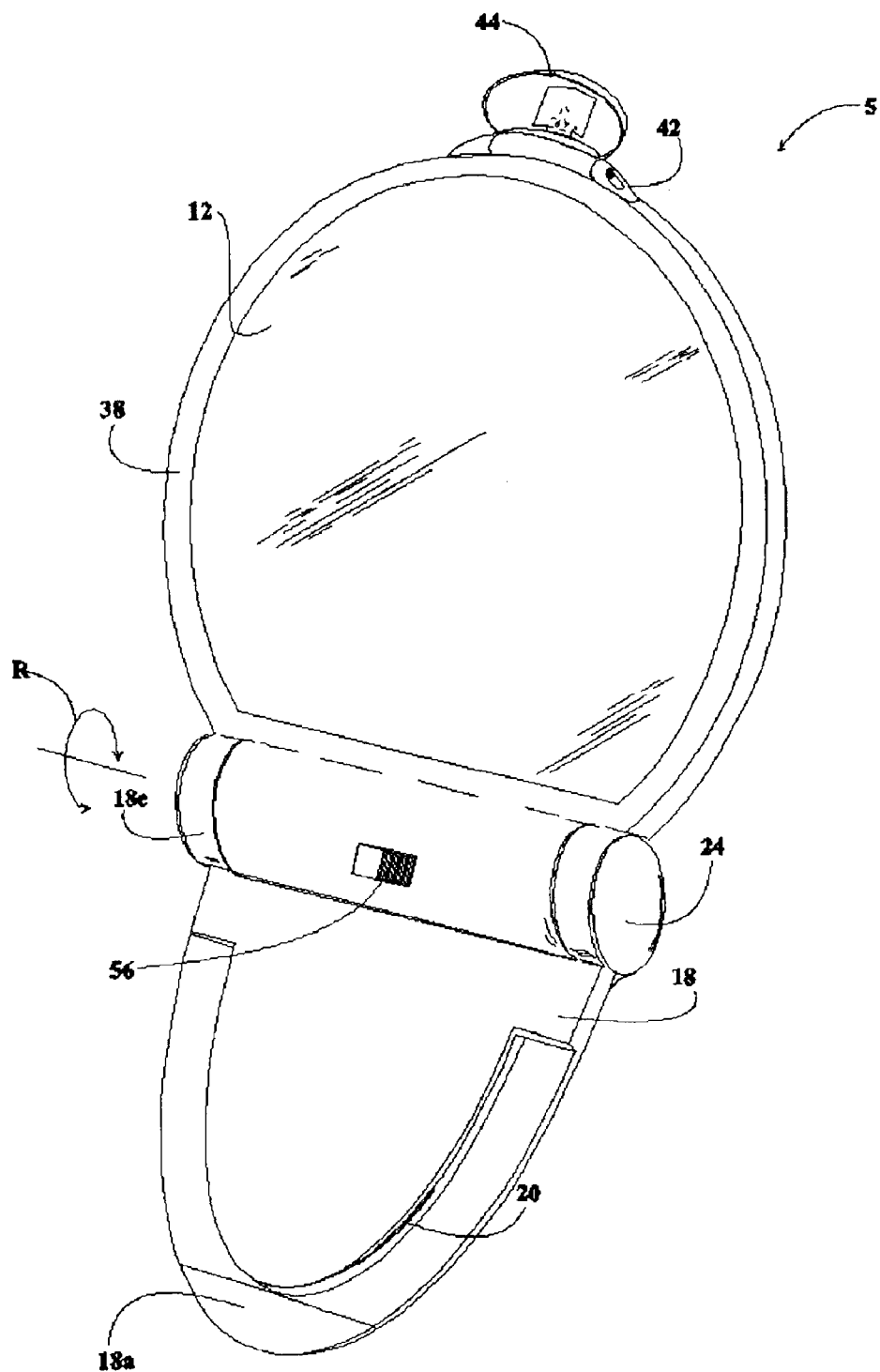
FIG. 12 is another perspective view of the adjustable book mirror and light combination according to FIG. 11, wherein the book light is illustrated in an open position.

Refer now to FIGS. 11 and 12 where a perspective and front views are shown according to another embodiment of the invention. As can be seen, a combination book mirror/light 5 will now not only allow the reader to see the person's facial expressions and vise-versa, the book or magazine or any other document will now have the capability to have its pages, or the faces of the listener and/or reader, illuminated by a light bulb or light-emitting-diode (LED) or similar lighting source. Note that this version of the invention is very analogous to the one pictured in FIG. 3. However, a modification has been incorporated to now allow a book light to be turned on or off for better viewing of the reading material. A book light top shell 44 is connected to the top edge of a top mirror shell 38 and a bottom mirror shell by a pair of light hinges 42. An on/off switch 56 controls power to the book light. This configuration will allow the book light to be adjusted in any position along the vertical axis of the book mirror/light 5.

Figure 13:
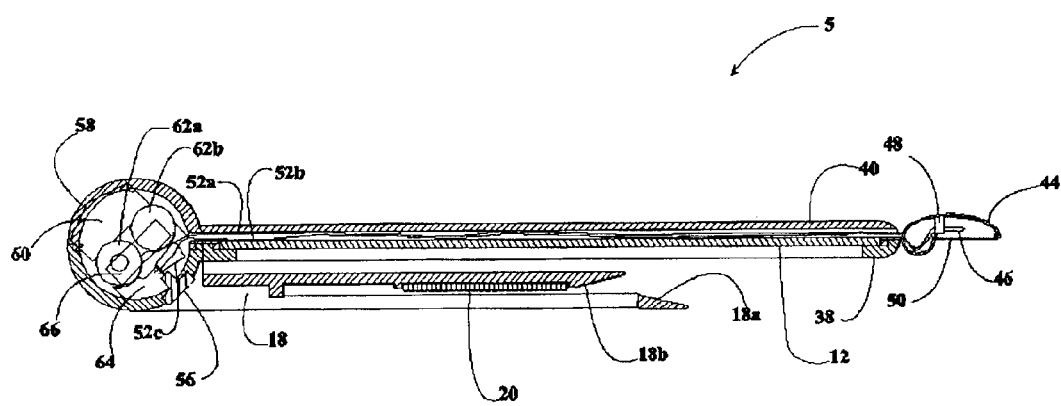
FIG. 13 is a cross-sectional side view of the present adjustable book mirror and light combination invention.

Refer now to FIG. 13 where a cross-sectional side view of the book mirror/light 5 invention is shown. It can be seen that the base 18 is the same base used in previous FIGS. 4–7. So its manufacturing, assembly, and operation processes will not be repeated. However, the rest of the invention is quite different and will now be explained.

The on/off power switch 56 is shown inserted into a slot in the modified top shell 38. Also, the minor 12 is held in place when the modified top shell 38 and a modified bottom shell 40 are both glued firmly together and allowed to dry. The light assembly consists of a light bulb 46 which is held in place by a light socket 48 which is mounted to the inner side of the book light top shell 44. A clear-plastic lens 50 is inserted into the book light top shell 44 to help protect fingers from possibly getting burned. This whole assembly is connected to the rest of the invention though the use of a couple of steel pins (not shown). An electrical wire 52a is then soldered to one of the two terminals of the light socket 48. The electrical wire 52a is then run inside the length of the whole minor assembly and soldered to a negative terminal metal tab that is electrically connected to the negative terminal of a battery 62a. Another electrical wire 52b is then soldered to the other terminal of the light socket 48 and it too is run the length of the invention in the space behind the mirror 12. The other end of the wire 52b is then soldered to one of the two terminals of the power on/off switch 56. A third wire 52c is then soldered to a positive terminal metal tab (not shown) that is electrically connected to the positive terminal of a second battery 62b. The chemical batteries 62a and 62b are held firmly battery support 64 which is molded into the inside of the plastic battery chamber. The other side of the batteries 62a and 62b is supported by a sponge pad 60 that is glued to the inside of a plastic battery access door 58. To complete the electrical circuit, a metal shorting terminal 66 is connected between the positive terminal of battery 62a and the negative terminal of battery 62b. This will electrically configure the pair of chemical batteries 62a and 62b together in series.

Figure 14:
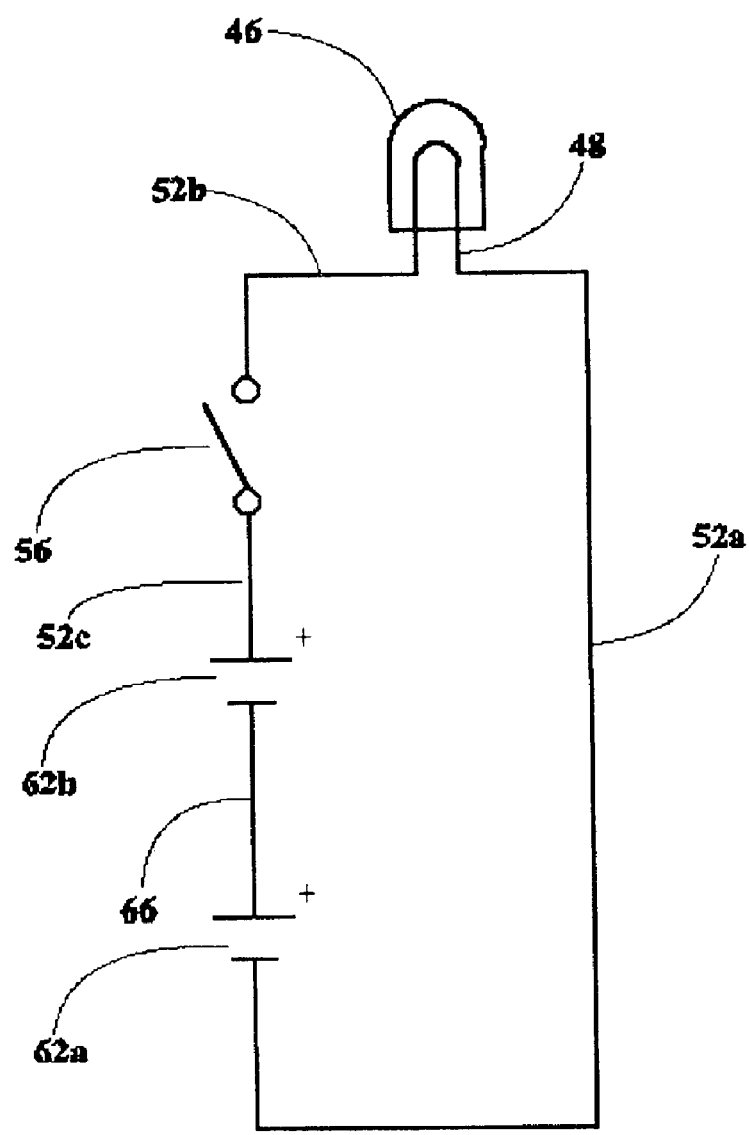
FIG. 14 is an electrical diagram of the circuit used in the embodiment of the adjustable book mirror and light combination invention.

Refer now to FIG. 14 where an electrical diagram is shown according to the embodiments of the book mirror/light invention. This diagram is an electrical schematic for the invention used in FIGS. 11–13. As can be seen, the light bulb 46 is electrically connected to the wire 52a and wire 52b through the light socket 48. One end of wir 52a is then soldered to a negative terminal metal tab that is electrically connected to the negative terminal of battery 62a. Likewise, the other end of wire 52b is soldered to one terminal of the power on/off switch 56. The other terminal of the power on/off switch 56 is soldered to wire 52c, which has its other end soldered to a positive terminal metal tab that is electrically connected to the positive terminal of battery 62b. To complete the series circuit, the metal shorting terminal 66 is electrically connected between the positive terminal of battery 62a and negative terminal of battery 62b.

Figure 15:
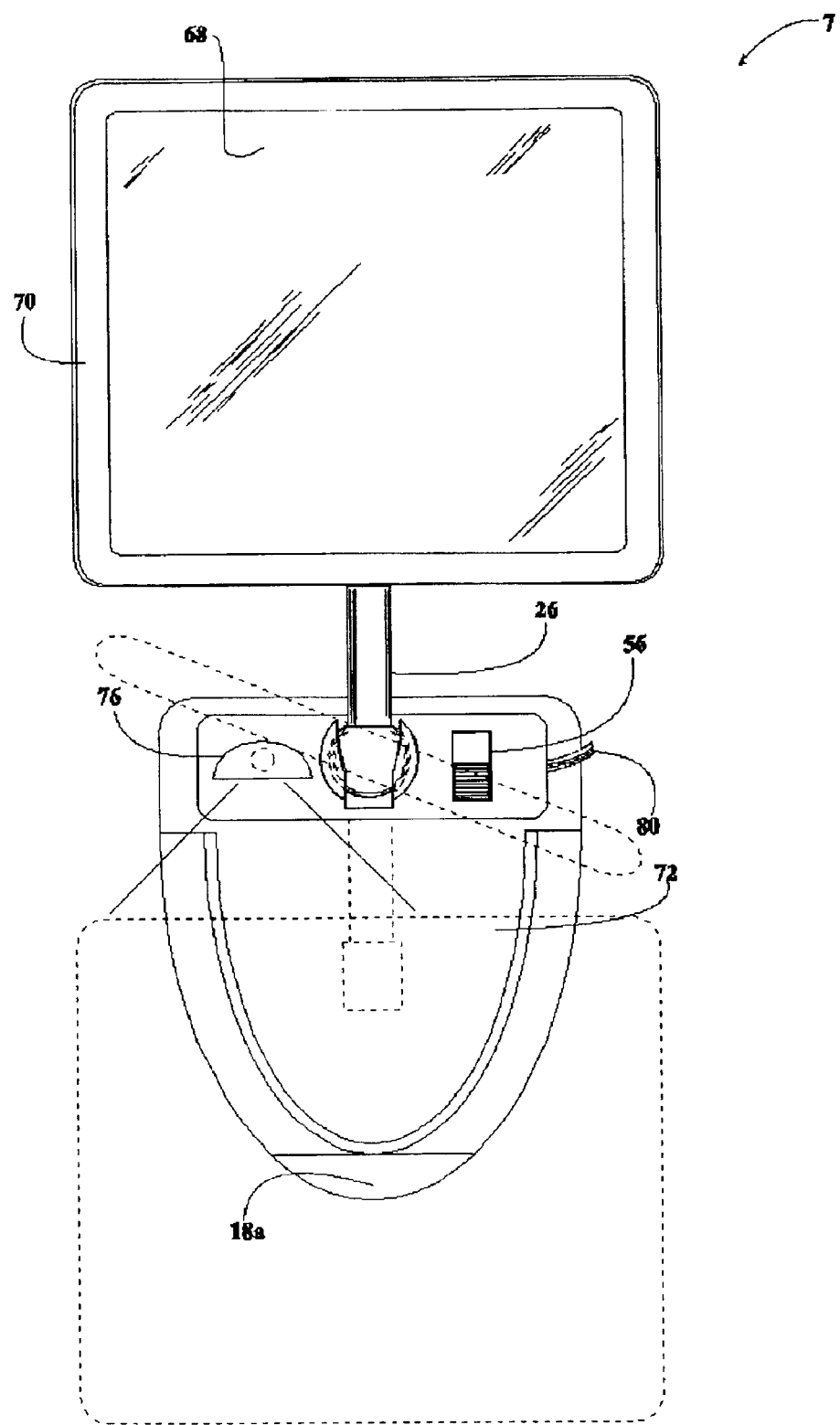
FIG. 15 is a front view of a pivoting book mirror and light invention according to another embodiment.
Figure 16:
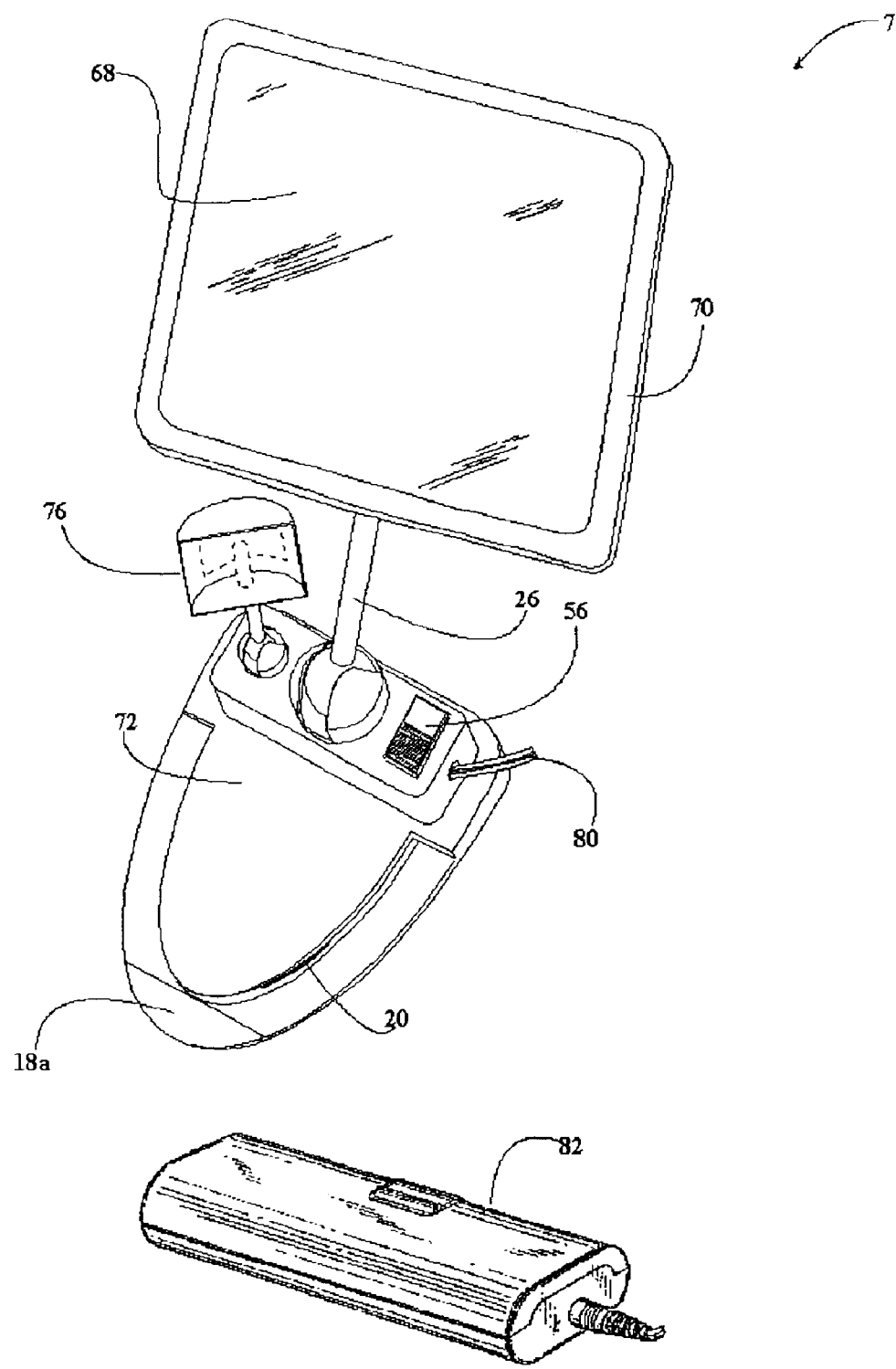
FIG. 16 is another perspective view of the present pivoting book mirror and light invention shown in FIG. 15.

Refer now to FIGS. 15 and 16 where front and perspective views of a pivoting book mirror/light 7 is shown according to another embodiment of the invention. As can be seen, this invention is yet another of many possible variations of the book mirror/light invention. However this version is different than the previous one shown in FIGS. 11 and 12 because a swivel light 76 is now located at a pedestal 72 and can be rotated in any direction. In addition, a somewhat square or rectangular shaped mirror 68 is now enclosed in a similarly shaped upper enclosure 70 and lower enclosure (not shown). These parts are then connected to the tubular arm 26 using the same plastic screw-in type mechanism as previously mentioned in the specification paragraph for FIG. 10. Also, the round bottom tubular arm is assembled in the pedestal 72 the same fashion as what was described for FIGS. 9 and 10. This will allow for multi-dimensional rotation and pivoting in any direction to allow the user maximum flexibility in adjusting the square shaped mirror 68. Using this same design but on a smaller scale, the swivel light 76 can also be rotated in any direction. To make this version of the invention more lightweight, a power cord 80 is used to connect to a separate power source, such as a battery pack 82 or an alternating current outlet.

It will be appreciated that a pivoting adjustable mounting may used such as a ball-and-socket joint as depicted in FIG. 15, with either or both ends of pedestal 72 terminating in such a joint. Alternatively, one or more ends of the pedestal, or the lenth of the pedestal itself, may comprise a deformable connection, wherein the mounting may be bent by the user to a desired orientation.

Figure 17:
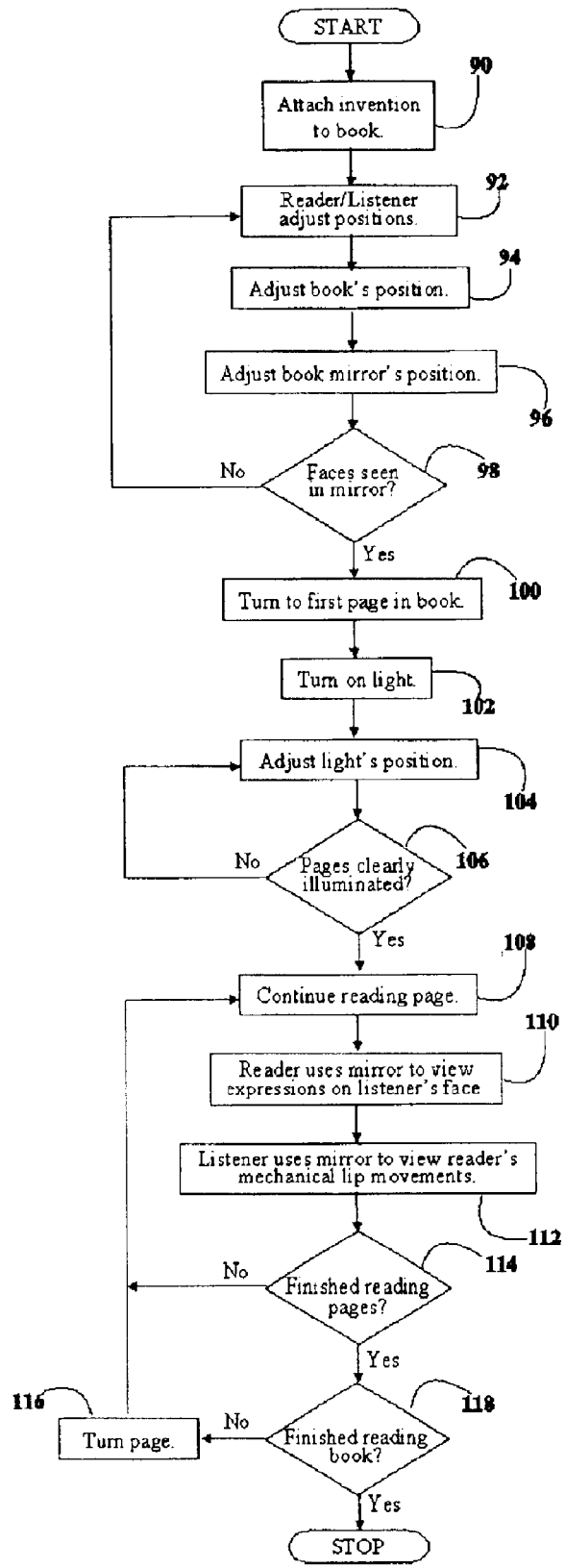
FIG. 17 is a flow chart diagram showing the methodology of utilizing the book-light-mirror according the embodiments of the invention.

Refer now to FIG. 17 wherein a flow chart diagram depicts the methodology of how to use the present book mirror or book mirror/light devices according to embodiments of the invention. As shown a step 90 is used by either the reader or listener of the book to attach the invention to the book. A step 92 is then used to allow users of the invention to adjust their positions. After that step is completed, a step 94 is used by adjust the position of the book, and subsequently the attached book-light-mirror invention, with respect to their own positions. Next, a step 96 is used to adjust the position of the book relative to the reader's and listener's positions. Next, both the reader and listener have to now decide, using a decision step 98, whether they can see each other's faces prior to reading. If the answer is false then step 92, step 94, and step 96 all should be to repeated until this condition becomes true. Once true, a step 100 is then used to turn to the first page in the book that is about to be read aloud. A step 102 is then used, for the book-light-mirror version of the invention, to turn on the light. The reader or listener can then adjust the light's position as shown in a step 104. The listener can subsequently use the mirror to view the reader's mouth to help correlate audio sounds and visual movements with words currently being read. Next, a decision has to be made, using a decision step 106, whether the pages of the book are clearly illuminated by the light. If false then step 104 should be repeated until the condition becomes true. Otherwise a step 108 is next used by the reader to articulate words from the pages of the book. The reader then uses the mirror to periodically watch facial expressions of the listener using a step 110. Likewise, the listener uses the mirror, at a step 112, to watch the reader's facial expressions. However, it is also the hope that the mirror will help the listener correlate the visual and audio cues with the current words being read from the book. Next, another decision has to be made, using a decision step 114, whether both pages of the book have been read. If false then the step 108, step 110, step 112 all have to be repeated until this condition becomes true. When the decision step 114 condition becomes true, then another decision, a decision step 118, has to be made whether the reader is finished reading the book. If decision step 118 is false then the step 108, step 110, step 112, and decision step 114 all should be repeated until this condition becomes true.

While the present invention has been illustrated by description of several embodiments and while the illustrative embodiments have been described in considerable detail, it is not the intention of the applicant to restrict or in any way limit the scope of the appended claims to such detail. Additional advantages and modifications may readily appear to those skilled in the art. For example, although injection plastic molding is described in some instances as economical method of manufacture, it will be appreciated that a broad range of materials and fabrication methods may be employed.

What is claimed is:

1. A device for obtaining visual feedback while reading a document to another individual, comprising:
    a gripping member for attaching to a portion of the document; and
    a reflective member attached to the gripping member at a preselected fixed orientation that cannot be changed.

2. The device of claim 1, wherein the reflective member comprises a convex mirror.

3. The device of claim 1, further comprising a light attached to the device.

4. The device of claim 3, wherein the light is adjustably mounted to the device.

5. A device for obtaining visual feedback while reading a document to another individual, comprising:
    a gripping member for attaching to a portion of the document, the gripping member comprising:
        a first substantially flat member; and
        a second substantially flat member disposed substantially parallel to the first substantially flat member, the first and second substantially flat members defining a slot for receiving the portion of the document;
    a convex mirror; and
    an adjustable mounting coupling the convex mirror to the gripping member, wherein the convex mirror is adjustable to an obtuse angle orientation with respect to the document.

6. The device of claim 5, wherein the adjustable mounting comprises hinged connection.

7. A the device for obtaining visual feedback while reading a document to another individual, comprising:

a gripping member for attaching to a portion of the document, the gripping member comprising:
  a first substantially flat member; and
  a second substantially flat member disposed substantially parallel to the first substantially flat member, the first and second substantially flat members defining a slot for receiving the portion of the document;

a substantially flat reflective member; and an adjustable mounting coupling the reflective member to the gripping member at a selected orientation, wherein the adjustable mounting comprises a ball and socket connection.

8. The device of claim 5, wherein the adjustable mounting comprises a deformable connective member.

9. The device of claim 5, further comprising a light attached to the device.

10. A device for obtaining visual feedback while reading a document to another individual, comprising:
  a gripping member for attaching to a portion of the document, the gripping member comprising;
    a first substantially flat member; and
    a second substantially flat member disposed substantially parallel to the first substantially flat member, the first and second substantially flat members defining a slot for receiving the portion of the document;
  a substantially flat reflective member;
  an adjustable mounting coupling the reflective member to the gripping member at a selected orientation; and
  a light adjustably mounted to the device.

11. A device for obtaining visual feedback while reading a document to another individual, comprising:
  a gripping member for attaching to a portion of the document, the gripping member comprising:
    a first substantially flat member; and
    a second substantially flat member disposed substantially parallel to the first substantially flat member, the first and second substantially flat members defining a slot for receiving the portion of the document;
  a convex mirror; and
  an adjustable mounting coupling the convex mirror to the gripping member at a selected orientation.

12. A method of a reader sharing a document reading experience with a listener, comprising:
  attaching a reflective device to the document;
  orienting the reflective device so that the reader and listener see each other in the reflective device; and
  reading the document.

13. The method of claim 12, further comprising:
  activating an illuminating device associated with the reflective device to illuminate the document.

14. The method of claim 12, wherein adjusting the reflective device comprising adjusting in a plurality of axes.

15. The method of claim 12, wherein orienting the reflective device comprises hingedly pivoting the reflective device.

16. The method of claim 15, wherein orienting the reflective device comprises rotating the reflective device.

17. The method of claim 15, wherein orienting the reflective device comprises deforming a connection attached to the reflective device.

18. A device for visual, nontextual communication while reading to another, comprising:
  a convex mirror;
  a means for attaching the convex mirror to a document, the means for attaching comprising:
    a first substantially flat member;
    a second substantially flat member disposed substantially parallel to the first substantially flat member, the first and second substantially flat members defining a slot for receiving a portion of the document; and
  a means for adjusting an orientation of the convex mirror to allow a reader and a listener to see each others faces.

19. The device of claim 18, further comprising a means for illuminating the document.

20. A method of a reader reading a document, comprising:
  attaching a reflective device to the document;
  orienting the reflective device so that the reader sees his face in the reflective device; and
  reading the document.

21. The method of claim 20, further comprising:
  activating an illuminating device associated with the reflective device to illuminate the document.

22. The method of claim 20, wherein adjusting the reflective device comprising adjusting in a plurality of axes.

23. The method of claim 20, wherein orienting the reflective device comprises hingedly pivoting the reflective device.

24. The method of claim 20, wherein orienting the reflective device comprises rotating the reflective device.

25. The method of claim 20, wherein orienting the reflective device comprises deforming a connection attached to the reflective device.

26. A device for obtaining visual feedback while reading a document to another individual, comprising:
  a gripping member for attaching to a portion of the document;
  a reflective member attached to the gripping member, wherein the reflective member is at an obtuse angle orientation with respect to the document; and
  a light adjustably mounted to the device.

27. The device of claim 26, wherein the gripping member further comprises:
  a first substantially flat member; and
  a second substantially flat member disposed substantially parallel to the first substantially flat member, the first and second substantially flat members defining a slot for receiving the portion of the document.

* * * * *